United States Patent
Lee et al.

(10) Patent No.: US 6,599,568 B2
(45) Date of Patent: Jul. 29, 2003

(54) METHOD FOR COOLING ENGINE COMPONENTS USING MULTI-LAYER BARRIER COATING

(75) Inventors: Ching-Pang Lee, Cincinnati, OH (US); Robert Edward Schafrik, Cincinnati, OH (US); Ramgopal Darolia, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/247,408

(22) Filed: Sep. 19, 2002

(65) Prior Publication Data

US 2003/0021905 A1 Jan. 30, 2003

Related U.S. Application Data

(62) Division of application No. 09/707,024, filed on Nov. 6, 2000, now Pat. No. 6,511,762.

(51) Int. Cl.[7] .............................. B05D 7/22; B05D 1/36; B05D 3/00
(52) U.S. Cl. ..................... 427/230; 427/239; 427/402; 427/404; 427/419.2; 427/419.3; 427/275; 427/554; 428/697
(58) Field of Search .............................. 427/230, 239, 427/402, 404, 419.2, 419.3, 554, 555, 556, 275; 428/697

(56) References Cited

U.S. PATENT DOCUMENTS

| | | | |
|---|---|---|---|
| 4,503,130 A | 3/1985 | Bosshart et al. ............. 428/632 |
| 4,576,874 A | 3/1986 | Spengler et al. ............. 428/623 |
| 5,059,095 A | 10/1991 | Kushner et al. ............. 416/241 |
| 5,320,909 A | 6/1994 | Scharman et al. .......... 428/472 |
| 5,427,866 A | 6/1995 | Nagaraj et al. ............. 428/610 |
| 5,630,314 A | 5/1997 | Kojima et al. |
| 5,683,825 A | 11/1997 | Bruce et al. ................ 428/698 |
| 5,705,231 A | 1/1998 | Nissley ...................... 427/453 |
| 5,846,605 A | 12/1998 | Rickerby ..................... 427/255 |
| 5,876,860 A | 3/1999 | Marijnissen et al. ........ 428/623 |
| 5,906,895 A | 5/1999 | Hamada et al. ............. 428/610 |
| 5,985,467 A | 11/1999 | Beele .......................... 428/623 |
| 5,993,980 A | 11/1999 | Schmitz et al. ............. 428/633 |
| 6,007,926 A | 12/1999 | Provenzano et al. ........ 428/633 |
| 6,042,951 A | 3/2000 | Kojima et al. .............. 428/633 |
| 6,045,928 A * | 4/2000 | Tsantrizos et al. .......... 428/623 |
| 6,273,678 B1 * | 8/2001 | Ramgopal ................... 415/200 |
| 6,511,762 B1 * | 1/2003 | Lee et al. .................... 428/697 |

* cited by examiner

*Primary Examiner*—Michael Barr
(74) *Attorney, Agent, or Firm*—Carmen Santa Maria; McNees Wallace & Nurick LLC

(57) ABSTRACT

A cooling system for cooling of the flow path surface region of an engine component used in a gas turbine engine and a method for making a system for cooling of the flow path surface region of an engine component used in a gas turbine engine. The method comprises the steps of channeling apertures in a substrate to a diameter of about 0.0005" to about 0.02" to allow passage of cooling fluid from a cooling fluid source; applying a bond coat of about 0.0005" to about 0.005" in thickness to the substrate such that the bond coat partially fills the channels; applying a porous inner TBC layer of at least about 0.01" in thickness to the bond coat, such that the TBC fills the channels; applying an intermediate ceramic layer that is more dense than the inner TBC layer on top of the porous TBC; applying an outer TBC layer over the intermediate layer; and, passing cooling fluid from a cooling fluid source through the channel into the porous TBC. The density of the outer TBC layer can be varied as needed to achieve desired cooling objectives. Because the channel exit is filled with porous TBC material, cooling fluid flows through the porous passageways into the inner TBC layer. Although the passageways provide a plurality of tortuous routes, the increased density of the TBC in the intermediate layer provides a resistance to flow of the cooling fluid and effectively causes the cooling fluid to more efficiently spread through the TBC in the inner layer before exiting at the outer surface.

7 Claims, 6 Drawing Sheets

METHOD FOR COOLING ENGINE COMPONENTS USING MULTI-LAYER BARRIER COATING

CROSS-REFERENCE TO RELATED APPLICATIONS

This application is a division of application Ser. No. 09/707,024 filed Nov. 6, 2000, which is now U.S. Pat. No. 6,511,762.

This application references co-pending applications assigned to the assignee of the present invention, which are identified and entitled "Directly Cooled Thermal Barrier Coating System", and entitled "Transpiration Cooling in Thermal Barrier Coating", the contents of which are incorporated herein by reference.

FIELD OF THE INVENTION

This invention relates generally to gas turbine engines, and in particular, to a cooled flow path surface region.

BACKGROUND OF THE INVENTION

In gas turbine engines, for example, aircraft engines, air is drawn into the front of the engine, compressed by a shaft-mounted rotary-type compressor, and mixed with fuel. The mixture is burned, and the hot exhaust gases are passed through a turbine mounted on a shaft. The flow of gas turns the turbine, which turns the shaft and drives the compressor and fan. The hot exhaust gases flow from the back of the engine, driving it and the aircraft forward.

During operation of gas turbine engines, the temperatures of combustion gases may exceed 3,000° F., considerably higher than the melting temperatures of the metal parts of the engine, which are in contact with these gases. Operation of these engines at gas temperatures that are above the metal part melting temperatures is a well established art, and depends in part on supplying a cooling air to the outer surfaces of the metal parts through various methods. The metal parts of these engines that are particularly subject to high temperatures, and thus require particular attention with respect to cooling, are metal parts forming combustors and parts located aft of the combustor including turbine blades, turbine vanes and exhaust nozzles.

The hotter the turbine inlet gases, the more efficient is the operation of the jet engine. There is thus an incentive to raise the turbine inlet gas temperature. However, the maximum temperature of the turbine inlet gases is normally limited by the materials used to fabricate the turbine vanes and turbine blades of the turbine. In current engines, the turbine vanes and blades are made of nickel-based superalloys, and can operate at metal surface temperatures of up to 2100°–2200° F.

The metal temperatures can be maintained below melting levels with current cooling techniques by using a combination of improved cooling designs and insulating thermal barrier coatings (TBCs). For example, with regard to the metal blades and vanes employed in aircraft engines, some cooling is achieved through convection by providing passages for flow of cooling air internally within the blades so that heat may be removed from the metal structure of the blade by the cooling air. Such blades essentially have intricate serpentine passageways within structural metal forming the cooling circuits of the blade.

Small internal orifices have also been devised to direct this circulating cooling air directly against certain inner surfaces of the airfoil to obtain cooling of the inner surface by impingement of the cooling air against the surface, a process known as impingement cooling. In addition, an array of small holes extending from the hollow core through the blade shell can provide for bleeding cooling air through the blade shell to the outer surface where a film of such air can protect the blade from direct contact with the hot gases passing through the engines, a process known as film cooling.

In another approach, a TBC is applied to the turbine blade component, which forms an interface between the metallic component and the hot gases of combustion. The TBC includes a ceramic coating that is applied to the external surface of metal parts within engines to impede the transfer of heat from hot combustion gases to the metal parts, thus insulating the component from the hot combustion gas. This permits the combustion gas to be hotter than would otherwise be possible with the particular material and fabrication process of the component. TBCs have also been used in combination with film cooling techniques wherein an array of fine holes extends from the hollow core through the TBC to provide cooling air onto the outer surface of the TBC.

TBCs are well-known ceramic coatings, for example, yttrium-stabilized zirconia (YSZ). Ceramic TBCs usually do not adhere well directly to the superalloys used in the substrates. Therefore, an additional metallic layer called a bond coat is placed between the substrate and the thermal barrier coating. The bond coat may be made of a nickel-containing overlay alloy, such as a NiCrAlY or a NiCoCrAlY, or other composition more resistant to environmental damage than the substrate, or alternatively, the bond coat may be a diffusion nickel aluminide or platinum aluminide, whose surface oxidizes to a protective aluminum oxide scale that provides improved adherence to the ceramic top coatings. The bond coat and the overlying TBC are frequently referred to as a thermal barrier coating system.

Multi layer coatings are known in the art. For example, U.S. Pat. No. 5,846,605 to Rickerby, et al., is directed to a coating having a plurality of alternate layers having different structures that produce a plurality of interfaces. The interfaces provide paths of increased resistance to heat transfer to reduce thermal conductivity. A bond coat overlying a metallic substrate is bonded to a TBC. The TBC comprises a plurality of layers, each layer having columnar grains, the columnar grains in each layer extending substantially perpendicular to the interface between the bond coating and metallic substrate. The structure is columnar to ensure that the strain tolerance of the ceramic TBC is not impaired. The difference in structure of the layers is the result of variations in the microstructure and/or density/coarseness of the columnar grains of the ceramic.

U.S. Pat. No. 5,705,231 to Nissley et al. is directed to a segmented abradable ceramic coating system having enhanced abradability and erosion resistance. A segmented abradable ceramic coating is applied to a bond coat comprising three ceramic layers that are individually applied. There is a base coat foundation layer, a graded interlayer, and an abradable top layer. The coating is characterized by a plurality of vertical microcracks.

U.S. Pat. No. 4,503,130 to Bosshart et al. is directed to coatings having a low stress to strength ratio across the depth of the coating. Graded layers of metal/ceramic material having increasing ceramic composition are sequentially applied to the metal substrate under conditions of varied substrate temperature.

U.S. Pat. No. 6,045,928 to Tsantrizos et al. is directed to a TBC comprising an MCrAlY bond coat and a dual constituent ceramic topcoat. The topcoat comprises a monolithic zirconia layer adjacent to the bond coat, a monolithic layer of calcia-silica representing the outer surface of the TBC and a graded interface between the two to achieve good adhesion between the two constituents to achieve an increased thickness of the topcoat, thereby, providing for a greater temperature drop across the TBC system.

U.S. Pat. No. 4,576,874 to Spengler et al. is directed to a coating to increase resistance to spalling and corrosion. The coating is not intended to be a thermal barrier coating. A porous ceramic is applied over a MCrAlY bond coat and a dense ceramic is then applied over the porous ceramic. The porous portion is a transition zone to allow for differences in thermal expansion and provides little thermal insulation.

Improved environmental resistance to destructive oxidation and hot corrosion is desirable. In some instances, the alloying elements of the bond coat can interdiffuse with the substrate alloy and consume walls of the turbine airfoils, i.e., reduce load carrying capability. This interdiffusion also reduces environmental resistance of the coating. Even with the use of advanced cooling designs and thermal barrier coatings, it is also desirable to decrease the requirement for cooling; because reducing the demand for cooling is also well known to improve overall engine operating efficiency.

While superalloys coated with thermal barrier coating systems do provide substantially improved performance over uncoated materials, there remains room for improvement. Film cooling is achieved by passing cooling air through discrete film cooling holes, typically ranging from 0.015" to about 0.030" in hole diameters. The film cooling holes are typically drilled with laser or EDM or ES machining. Due to mechanical limitations, each film hole has an angle ranging from 20° to 90° relative to the external surface. Therefore, each film jet exits from the hole with a velocity component perpendicular to the surface. Because of this vertical velocity component and a flow circulation around each jet due to the jet mixing, each film jet will have a tendency to lift or blow off from the external surface and mix with the hot exhaust gases, resulting in poor film cooling effectiveness.

Thus, there is an ongoing need for an improved thermal barrier coating system, wherein the environmental resistance and long-term stability of the thermal barrier coating system is improved so that higher engine efficiencies can be achieved. The bond coat temperature limit is critical to the TBC's life and has had an upper limit of about 2100° F. Once the bond coat exceeds this temperature, the coating system will quickly deteriorate, due to high temperature mechanical deformation and oxidation, as well as interdiffusion of elements with the substrate alloy. The coating system can separate from the substrate exposing the underlying superalloy component to damage from the hot gasses.

What is needed are improved designs that will allow turbine engine components to run at higher operating temperatures, thus improving engine performance without additional cooling air. It is desirable to have a system that can take advantage of the thermal insulation provided by TBC. The present invention fulfills this need, and further provides related advantages.

BRIEF SUMMARY OF THE INVENTION

The present invention provides a method for cooling the flow path surface region of an engine component used in a gas turbine engine comprising the steps of channeling apertures in a substrate to a diameter of about 0.0005" to about 0.02" to allow passage of cooling fluid from a cooling fluid source; applying a bond coat of about 0.0005" to about 0.005" in thickness to the substrate such that the bond coat partially fills the channels; applying a porous inner TBC layer of at least about 0.003" in thickness to the bond coat, such that the TBC fills the channels; applying an intermediate ceramic layer that is more dense than the inner TBC layer on top of the porous TBC; applying an outer TBC layer that is more dense than the inner TBC layer over the intermediate layer; and, passing cooling fluid from a cooling fluid source through the channel into the porous TBC. Because the channel exit is filled with porous TBC material, cooling fluid flows through the porous passageways into the inner TBC layer. Although the passageways are interconnected and provide a plurality of tortuous routes, the increased density of the TBC in the intermediate layer provides a resistance to flow of the cooling fluid and effectively causes the cooling fluid to more efficiently spread through the TBC in the inner layer before exiting at the outer surface The present invention further comprises both the cooled flow path surface regions formed by the foregoing methods and the turbine component with the ceramic layers for cooling the component.

In a different embodiment, the present invention comprises a cooling channel having a first and second end, the first end terminating in an exit orifice located on the surface of a substrate, the second end connecting to a cooling circuit contained within a turbine engine component. The cooling channel preferably has a substantially circular diameter of about 0.002" to about 0.008". Applied to the substrate is a bond coat of about 0.0005" to about 0.005" in thickness that partially fills the exit orifice and first channel end. Applied to the bond coat is a porous inner TBC layer of at least about 0.003" in thickness such that the porous TBC fills the remainder of the exit orifice. An intermediate ceramic layer that is more dense than the porous inner TBC is applied on top of the porous inner TBC, and an outer TBC layer that is less porous than the inner TBC layer is then applied on top of the intermediate layer.

An advantage of the present invention is that the multi-layered TBC system forms cooling paths adjacent to the substrate surface to provide efficient cooling for both the substrate and the bond coat by allowing heat to be removed from the article.

Still another advantage of the present invention is that the outer flow path surface region of the coated gas turbine component is actively cooled through transpiration cooling inside the TBC. Transpiration cooling inside the TBC will lower the TBC temperature, and allow a greater thermal gradient between the hot exhaust gas stream and the bond coat. By removing heat from this region by transpiration, the integrity of the bond coat can be maintained at higher engine firing temperatures, resulting in a more efficient usage of cooling fluid to achieve a higher turbine engine efficiency and performance.

Another advantage of the present invention is that because the TBC is processed to have a varying density, and hence variable porosity, cooling fluid is able to flow through the inner TBC passageways and further spread through the outer TBC layer providing transpiration cooling before exiting to the outer TBC surface or flow through discrete holes providing film cooling, or both.

Still another advantage of the present invention is that the cooling channel exit orifices or holes, being filled, have more flow resistance than open holes and, therefore, provide a more effective cross-sectional hole area compared to unfilled larger holes for flowing the same amount of cooling fluid, resulting in more efficient heat transfer.

Yet another advantage is that the characteristics of many smaller passageways through the TBC will result in a much larger heat transfer area for cooling the bond coat and the substrate than that provided by fewer larger holes having the same total flow cross-section area.

Still another advantage is that improved cooling reduces or eliminates sintering of the ceramic top coat so that low thermal conductivity is maintained in the TBC.

Other features and advantages of the present invention will be apparent from the following more detailed description of the preferred embodiment, taken in conjunction with the accompanying figures which illustrate, by way of example, the principles of the invention.

DETAILED DESCRIPTION OF THE INVENTION

In addition to methods for transpiration cooling of the flow path surface region of a coated gas turbine component, the present invention sets forth the processes of producing a porous TBC system which can be used for cooling of hot spots on any hot section component, such as turbine blades, turbine nozzles, combustors and the like.

Figure 1:
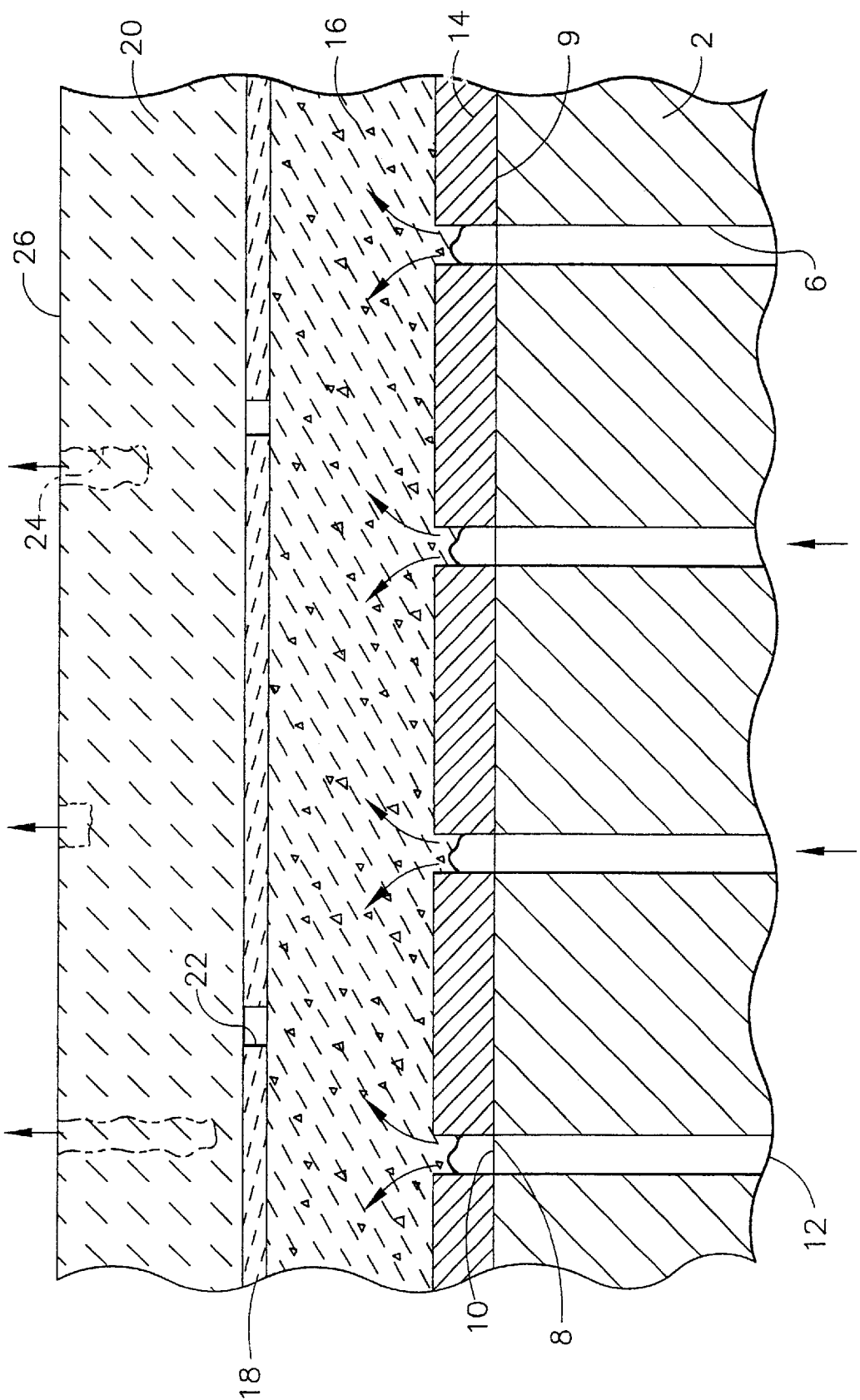
FIG. 1 is a representation of a form of a porous TBC of the present invention with film cooling.
Figure 2:
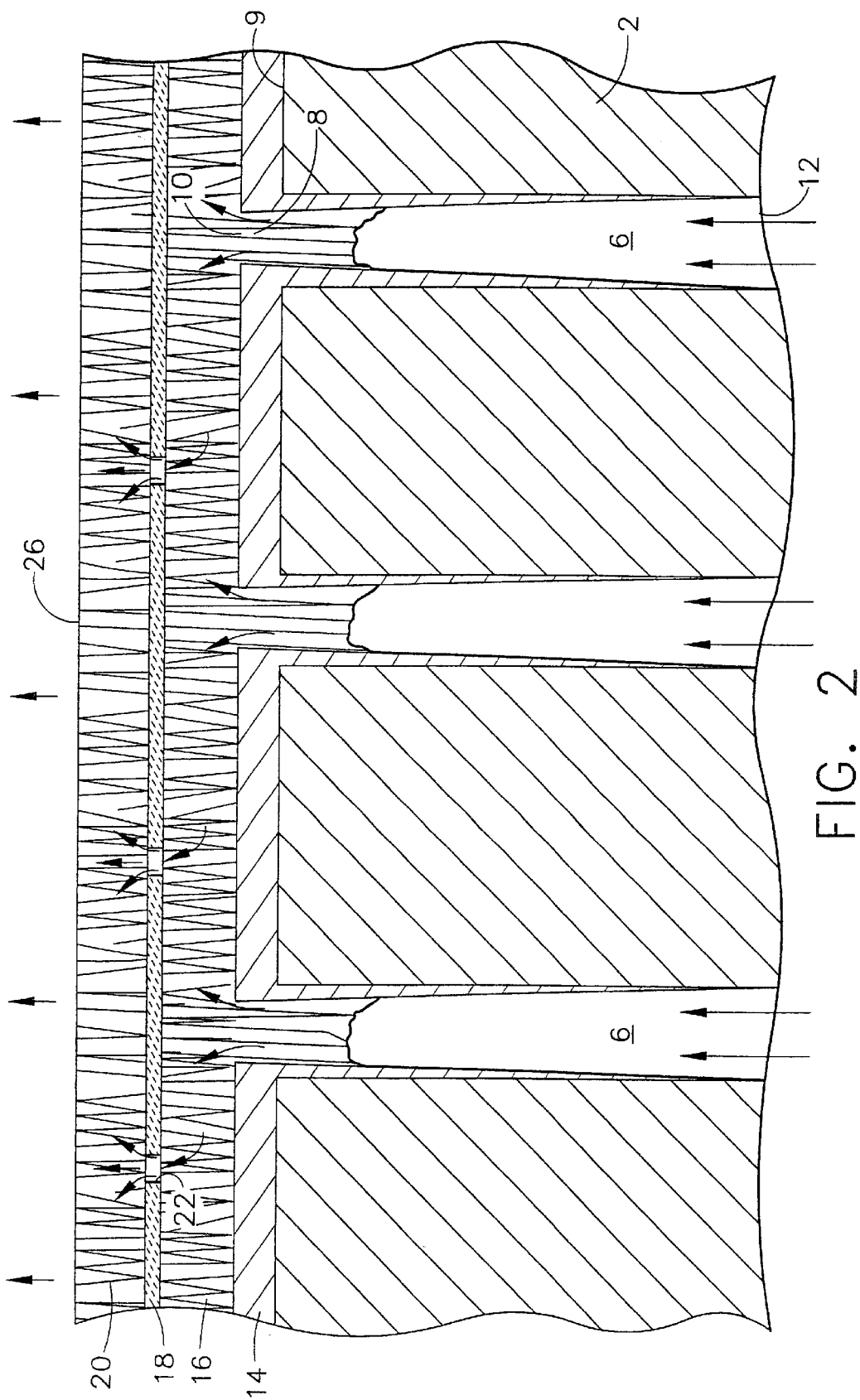
FIG. 2 is a representation of a form of a porous TBC of the present invention with transpiration cooling.

Referring now to the Figures, where like parts have the same numbers, in accordance with a preferred embodiment of the invention, there is shown in FIGS. 1 and 2 the substrate 2, of for example, a jet engine turbine blade cross section. Substrate materials often used in turbine parts or airfoils for aircraft engines and power generation equipment may include nickel, cobalt, or iron based superalloys. The alloys may be cast or wrought superalloys. Examples of such substrates are GTD-111, GTD-222, Rene' 80, Rene' 41; Rene' 125, Rene' 77, Rene' N4, Rene' N5, Rene' N6, 4$^{th}$ generation single crystal superalloy, MX-4, Hastelloy X, and cobalt-based HS-188.

A plurality of small channels 6, having a size of from about 0.0005" to about 0.02", and preferably about 0.002" to about 0.008" in diameter and having a substantially circular cross-section, are drilled, such as by laser beam, electrical discharge machining (EDM), electrochemical machining (ECM) or electrostream (ES) machining, into substrate 2. Alternatively, the channels 6 may be cast into the substrate 2. Because of the small size of the channels and the physical effects of the drilling on the material, it is difficult to maintain a true or perfect circular cross-section as the material distorts to provide an oval or elliptical cross section. A first channel end 8 terminates at an exit orifice 10 at a surface 9 of substrate 2. A second end 12 of channel 6 connects to the cooling circuits (not shown) contained within a turbine engine component.

A bond coat 14 is then applied to the substrate 2, such as, for example, a NiAl or PtAl base alloy applied by, for example, chemical vapor deposition (CVD). Alternatively, the bond coat 14 may be a MCrAl(X) application where M is an element selected from the group consisting of Fe, Co and Ni and combinations thereof and (X) is an element selected from the group of gamma prime formers, solid solution strengtheners, consisting of, for example, Ta, Re and reactive elements, such as Y, Zr, Hf, Si, and grain boundary strengtheners consisting of B, C and combinations thereof. The MCrAl (X) is applied by, for example, physical vapor deposition (PVD) processes such as electron beam (EB), ion-plasma deposition, or sputtering, and deposition temperatures can be 1600° F. or higher. Thermal spray processes such as air plasma spray (APS), low pressure plasma spray (LPPS) or high velocity oxyfuel (HVOF) spray can also be used.

The bond coat 14 is applied to a thickness of about 0.0005" to about 0.005", preferably about 0.002" in thickness. When the bond coat 14 is applied after the channels 6 have been drilled, bond coat 14 may partially close the exit orifices 10 of the channels 6. When bond coat 14 is applied first, followed by drilling of the small channels 6, minimum hole blockage by bond coat 14 will occur. However, placement of the bond coat 14 after drilling of channels 6 is preferred, to allow bond coat 14 partial entry into channels 6, thereby increasing ceramic top coat adherence. Application of bond coat 14 after drilling of channels 6 also provides a protective environmental coating over the exposed substrate forming the internal walls of channel 6.

After channels 6 are generated and the bond coat 14 is applied, a generally porous inner TBC top coat 16 comprised of a porous yttria-stabilized zirconia is applied on top of the bond coat 14. The porous YSZ structure can be achieved, for example, by applying the YSZ using PVD or plasma spray processes at temperatures in the range of 1600°–1800° F., which are lower than traditional YSZ application temperatures of 1825°–2150° F. Other methods may be utilized independent of the reduced temperature techniques or in combination with the reduced temperature techniques to achieve the porous YSZ structure.

The porous inner TBC layer 16 having a first preselected porosity is applied to a thickness of about 0.003" to about 0.010". When about 0.005" to about 0.010" of porous inner TBC layer 16 is applied, the channels 6 can be completely filled with TBC, or they may be partially filled by the porous inner TBC material 16 near the exits of the channels 6. An inner TBC layer 16 applied to a thickness greater than about 0.010" will completely span the channel exit orifices 10.

Applied on top of the inner TBC layer 16 is a dense, relative to the inner TBC layer 16, intermediate ceramic layer 18 having a second, preselected porosity or density. The intermediate ceramic layer 18 may be, for example, YSZ or ytrria zirconia, a thin layer of Al$_2$O$_3$, or any other suitable oxide, for example, zirconia modified with other refractory oxides, such as oxides formed from Group V and VI elements. Such oxide layers may be deposited by physical deposition processes such as EB-PVD. The method for forming a layer of a suitable oxide over intermediate ceramic layer 18 is not restricted to PVD techniques, and other processes also may be employed.

An outer TBC layer 20, about 0.005" to about 0.010", preferably about 0.005", is then applied on top of the intermediate layer 18 using deposition techniques similar to those used to apply the first layer and has a third preselected porosity or density. The density of this layer can be varied as desired using well known methods for varying deposition densities such as by varying the deposition temperature. While the outer TBC layer 20 is optional, when present, the inner TBC layer 16 desirably should have greater porosity than the outer TBC layer 20. If the outer TBC layer 20 is too porous it may sinter, thereby sealing a large portion of the outer surface from penetration by cooling fluid. This outer TBC layer may have a density that is higher or lower than that of the inner TBC layer, but it is more dense than the inner TBC layer. When the TBC outer layer is less dense than the intermediate TBC layer, cooling fluid reaching the outer layer will pass through to the outer surface of the layer with less resistance and provide cooling as it passes through. When the TBC outer layer is denser, or less porous, cooling fluid passing through the intermediate TBC layer will encounter more resistance as it reaches the denser outer layer. This will cause the cooling fluid to become more diffuse in the layer, providing cooling fluid to a greater volume of the outer layer.

Because the inner TBC layer 16 is processed to be porous, cooling fluid, for example, cooling air, is able to flow through the filled channels 6 and spread inside the porous inner TBC layer 16. The intermediate layer 18 is much denser than inner TBC, inhibiting through passage of cooling fluid, therefore, the porous inner TBC layer 16 between the bond coat 14 and the dense intermediate layer 18 effectively forms a cooling channel.

Physically created openings in the intermediate layer 18 and extending through it, for example, cracks and/or holes 22 machined with, a laser beam allow for passage of cooling fluid through the intermediate layer 18 into the outer TBC 20. The cooling fluid from the inner TBC layer 16 can pass through the holes 22 in the intermediate layer 18 and optionally exit through discrete film cooling holes 24 formed in the outer TBC layer extending to the surface 26 for film cooling. Alternatively, as shown in FIG. 1*b*, 1*f* no film cooling holes 24 are machined in the outer surface 26, the cooling fluid will exit the outer TBC layer 20 as transpiration cooling. In this manner, the TBC system has both cooling and insulation purposes. Because the composition and/or microstructure of the outer TBC layer 20 is different from the inner TBC layer 16, its structure may be controlled as required for specific applications, for example, for "hotspots" located on the engine component. Likewise, machined holes 22 in the intermediate layer 18 may also be positioned for specific applications, such as engine "hotspots".

Figure 3:
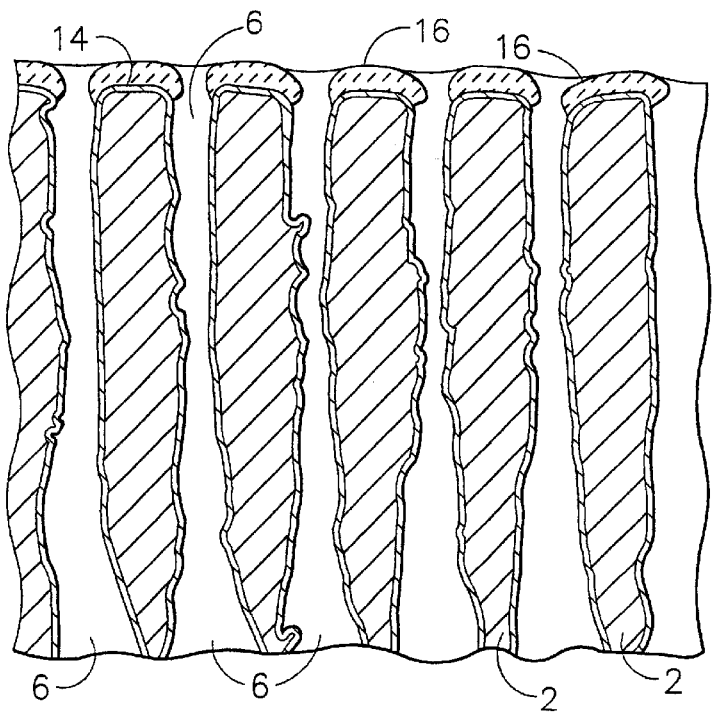
FIG. 3 shows the covered channels with an applied TBC system at a first contrast to highlight the bond coat.
Figure 4:
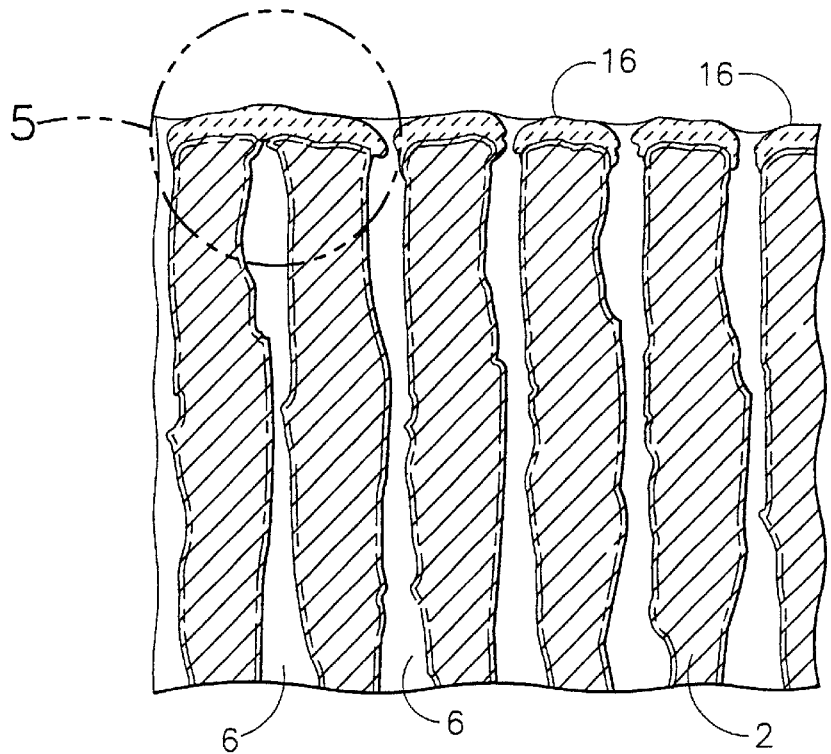
FIG. 4 shows the channels of FIG. 2 covered the a TBC system at a second contrast to highlight the ceramic top coat.
Figure 5:
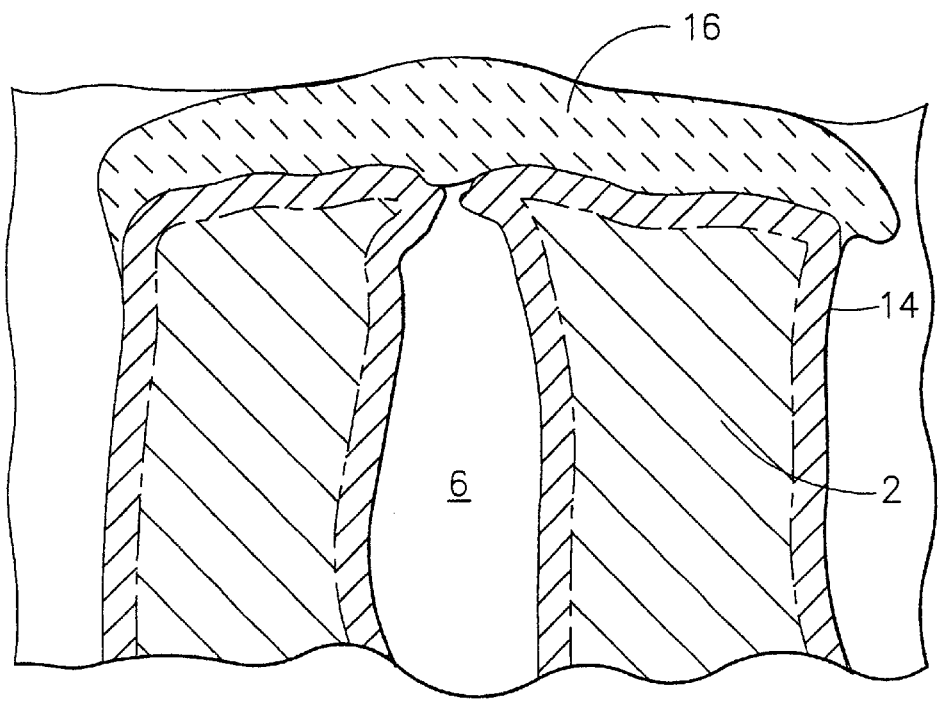
FIG. 5 is an enlarged view of section A1 of FIG. 3.
Figure 6:
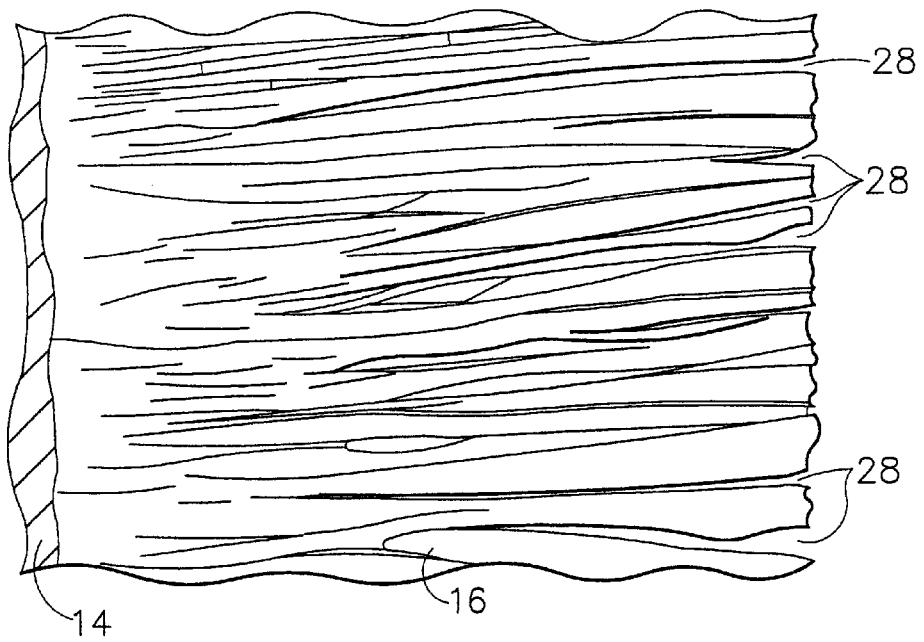
FIG. 6 depicts the porosity of the TBC layer of the present invention as gaps between the columnar grains.
Figure 7:
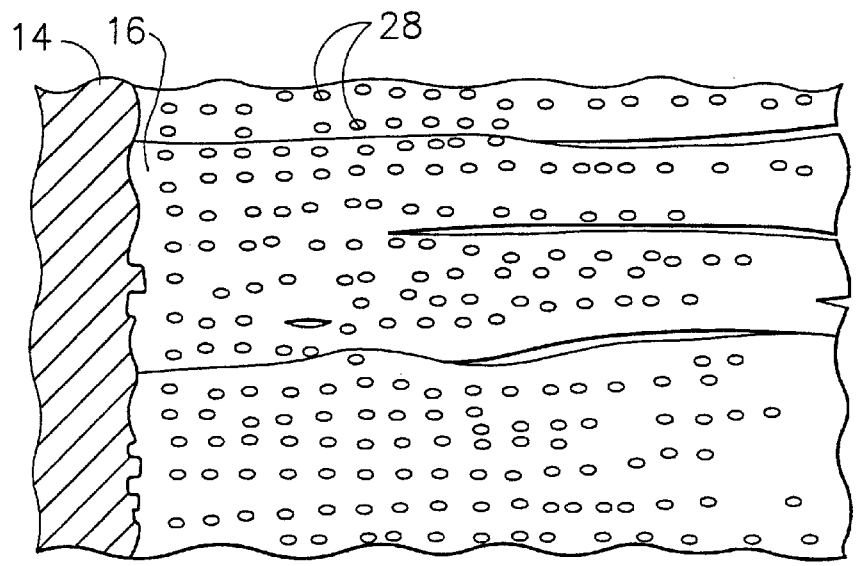
FIG. 7 shows a different view of the porosity of the TBC layer of the present invention.
Figure 8:
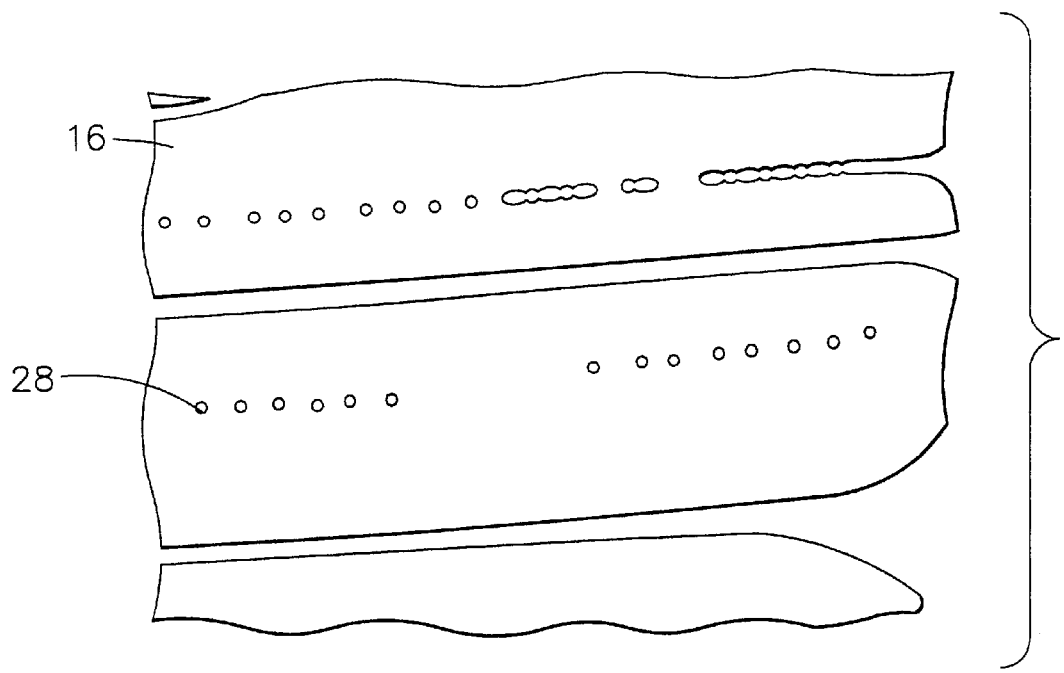
FIG. 8 provides still a different view of the porosity of the TBC layer of the present invention.

FIG. 3 depicts the existing TBC systems highlighting the bond coat 14 of the TBC system showing its relationship to the discrete channels utilized in the film cooling. As can be seen in FIG. 4, which highlights the ceramic top coat 16 of the TBC system of FIG. 3 and FIG. 5, the porous inner TBC layer 16 of the present invention completely cover the channel 6, allowing for transpiration cooling. FIGS. 6–8 depict the porous inner TBC layer 16 showing the porosity 28 of the inner TBC layer 16.

The cooling fluid passes into the cooling channels. As it reaches the exit, which is filled by the bond coat and TBC, the cooling fluid is diverted into the tortuous porosity that forms passageways for the cooling fluid. As the cooling fluid traverses through the porous inner TBC layer to the denser intermediate layer 18, it encounters more resistance and is further diverted into passageways that are more restricted due to the increased density. Again as the cooling fluid traverses into the denser outer TBC layer, additional resistance and further diversion occurs. However, as the cooling fluid traverses through the passageways, it removes heat from the adjoining TBC through which it passes. The cooling fluid, which is at an elevated temperature, ultimately is expelled, typically into the gas stream. In this manner, the bond coat 14 is kept at a reduced temperature through transpiration cooling. Utilizing the transpiration cooling provided by the present invention will allow a gas turbine engine to be operated at temperatures about 150° F. hotter than those presently employed, with a resulting dramatic increase in engine efficiencies.

The following example demonstrates the flow through porosity of the porous inner TBC layer 16.

EXAMPLE 1

Figure 9:
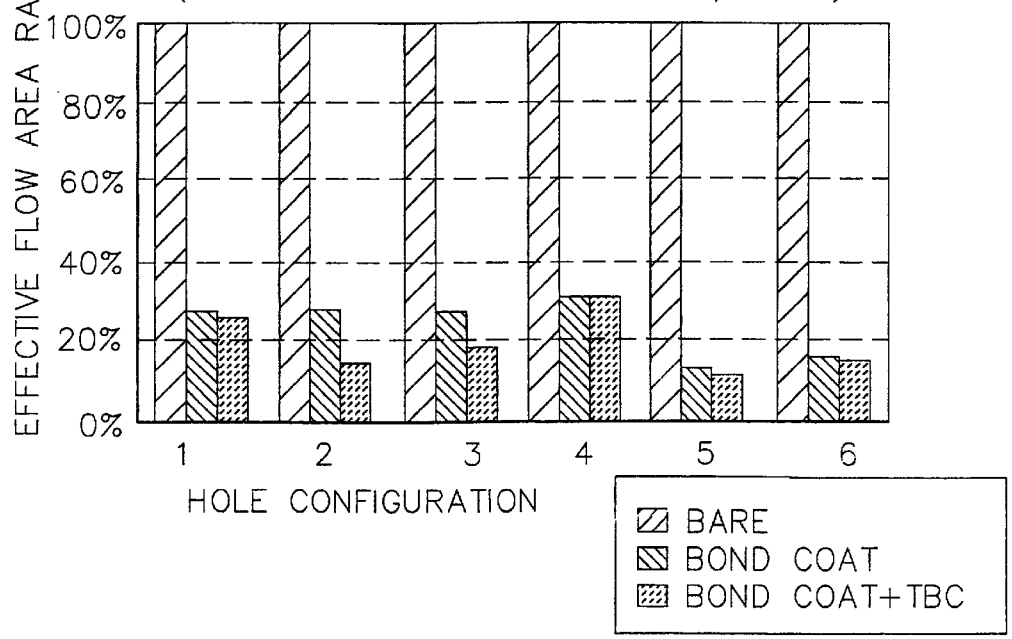
FIG. 9 depicts the flow test results of example 1.
Figure 9:
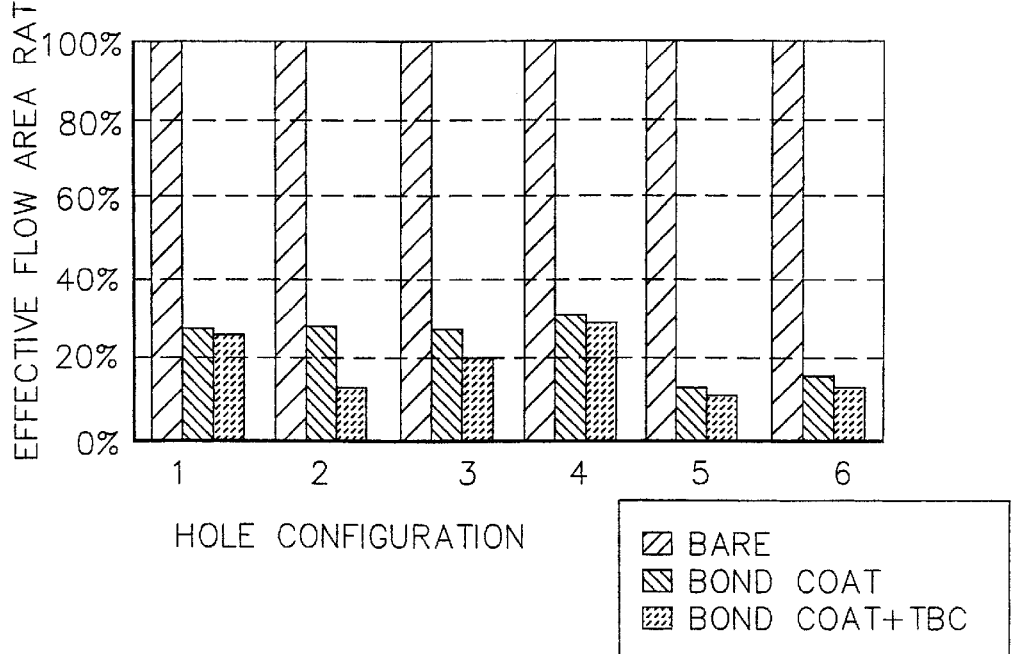

Six sample buttons were manufactured from Rene' N5, a nickel base superalloy frequently used in the turbine portion of a gas turbine engine. Each button was 1" in diameter and 0.125" in thickness and was prepared by drilling 400 holes through the sample button perpendicular to the surface using a laser beam. One hole configuration was drilled that provided holes or apertures that were substantially circular in cross-section. The diameter of the laser-drilled holes was varied. Two buttons were produced having hole sizes of about 0.004". Two buttons were produced having hole sizes of about 0.006". Two buttons were produced having hole sizes of bout 0.008". A total of six buttons were produced. A flow of air was passed by introducing air into a first side of each bare button through a plenum fixture designed to introduce pressurized air at a pressure of 1.3 times that of ambient into the button, with the flow inlet on the rough side, and again with the flow inlet on the smooth side of the sample button. The upstream pressure, temperature, downstream pressure and total flow rate were measured and used to calculate the flow function, the effective flow area and diameter. The same measurements and calculations were performed after the addition of 0.002" bond coat to the surface of the sample button and again after the addition of 0.005" porous TBC over the previously applied bond coat. In each case, the bond coat and the porous TBC filled the hole openings on the side of the button to which they were applied. As can be seen in tables 1 and 2 of FIG. 9, the addition of porous TBC to the bond coat had a small impact on airflow, demonstrating the continued flow of cooling fluid through the porosity of the TBC.

Although the present invention has been described in connection with specific examples and embodiments, those skilled in the art will recognize that the present invention is capable of other variations and modifications within its scope. For example, the outer TBC layer 20 may be omitted. These examples and embodiments are intended as typical of, rather than in any way limiting on, the scope of the present invention as presented in the appended claims.

What is claimed is:

1. A method for cooling of the flow path surface region of an engine component used in a gas turbine engine comprising the steps of:

channeling apertures having a diameter of about 0.002" to about 0.008" in a substrate of the component to allow passage of cooling fluid from a cooling fluid source to a surface of the substrate;

applying a bond coat having a thickness of about 0.0005" to about 0.005" to the surface of the substrate such that the bond coat partially fills the apertures near exit orifices at the substrate surface;

applying a first inner TBC layer having a first density having a thickness of at least about 0.003" over the bond coat, such that the TBC fills at least a portion of the remainder of the exit orifices;

applying a second intermediate ceramic layer on top of the first porous inner TBC layer, wherein the intermediate layer has a second density that is more dense than the first density of the inner TBC layer;

applying a third outer TBC layer over the intermediate layer, wherein the outer TBC layer has a third density that is more dense than the first density of the inner TBC layer; and passing cooling fluid from the cooling fluid source through the apertures in the substrate and into the porous inner TBC layer.

2. The method of claim 1 wherein the apertures are channeled in the substrate by laser drilling.

3. The method of claim 2 wherein the apertures have a substantially circular cross-section.

4. The method of claim 1 wherein the bond was applied a thickness of about 0.002".

5. The method of claim 1 wherein the step of applying a second intermediate ceramic layer on top of the first porous inner TBC layer additionally includes forming openings extending through the second intermediate layer.

6. The method of claim 1 wherein the step of applying a third outer ceramic layer over the second intermediate TBC layer additionally includes forming openings extending through the third outer TBC layer and opening onto an outer surface to provide film cooling.

7. A cooling system for cooling of the flow path surface region of an engine component used in a gas turbine engine formed by the method of claim 1.

* * * * *

UNITED STATES PATENT AND TRADEMARK OFFICE
CERTIFICATE OF CORRECTION

PATENT NO. : 6,599,568 B2  Page 1 of 1
DATED : July 29, 2003
INVENTOR(S) : Ching-Pang Lee, Robert Edward Schafrik and Ramgopal Darolia It is certified that error appears in the above-identified patent and that said Letters Patent is hereby corrected as shown below:

Column 7,
Line 41, "1f no film" should read -- If no film --.

Signed and Sealed this

Twenty-eighth Day of October, 2003

JAMES E. ROGAN
*Director of the United States Patent and Trademark Office*